D. T. WILBUR.
GAME.
APPLICATION FILED JUNE 4, 1920.

1,371,285.

Patented Mar. 15, 1921.
2 SHEETS—SHEET 1.

Inventor
Dorothy T. Wilbur
By Charles O. Marshall
Attorney

D. T. WILBUR.
GAME.
APPLICATION FILED JUNE 4, 1920.

1,371,285.   Patented Mar. 15, 1921.
2 SHEETS—SHEET 2.

Inventor
Dorothy T. Wilbur.
By Charles D. Marshall
Attorney

UNITED STATES PATENT OFFICE.

DOROTHY T. WILBUR, OF ST. PAUL, MINNESOTA.

GAME.

1,371,285.   Specification of Letters Patent.   Patented Mar. 15, 1921.

Application filed June 4, 1920. Serial No. 386,620.

*To all whom it may concern:*

Be it known that I, DOROTHY T. WILBUR, a citizen of the United States, residing at St. Paul, in the county of Ramsey and State of Minnesota, have invented certain new and useful Improvements in Games, of which the following is a specification.

This invention relates to games, and particularly to games of the class designed to instruct as well as to amuse, and one of its objects is the provision of an amusement device of this class which is so simple that it may be played by children but which is nevertheless capable of fascinating mature as well as youthful minds.

Another object is to provide a game of this character which implants a knowledge of the colors, relative brilliancies and positions of the stars in the great constellations and which, because of its striking arrangement and coloring, as well as the pleasure of playing, has an esthetic appeal capable of inducing a love of knowledge relating to the grander things of nature.

I attain these objects by means of a game board bearing diagrammatic representations of selected constellations and a set of playing chips or markers bearing representations of their prominent stars.

In order that the invention may be clearly understood, I have illustrated a preferred form thereof in the accompanying drawings, in which—

The game board 1 may be of any convenient size, such as 30″ x 30″ or 20″ x 20″, and is preferably hinged at its center so that it may be folded. The playing surface of the board or field is of dark ultramarine blue (indicated by horizontal lines in Figs. 1 and 2) to suggest the night-time sky, and bears diagrammatic representations of five constellations. The positions which the stars occupy in the constellations are indicated by white circles, and the constellations are outlined by lines connecting the circles. Within each circle is a name or number indicative of the star located thereby (see Fig. 2) and, if desired, diacritical marks may be applied to the letters of the names so that their pronunciation can be readily determined.

Figure 1:
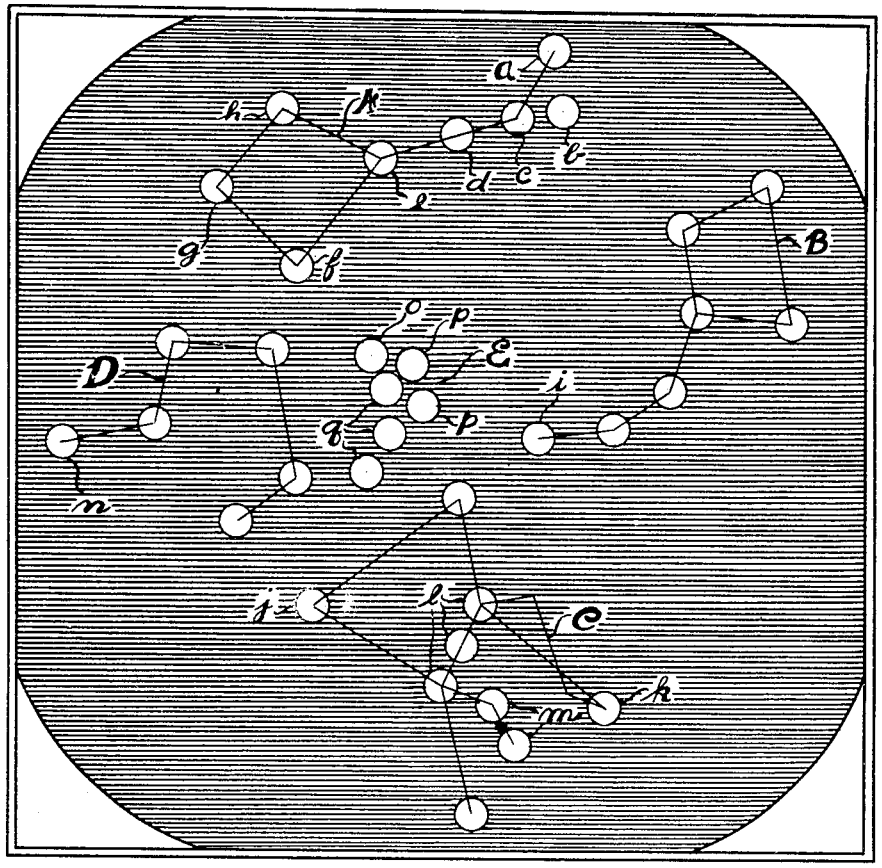
Figure 1 is a plan view of the game board.
Figure 2:
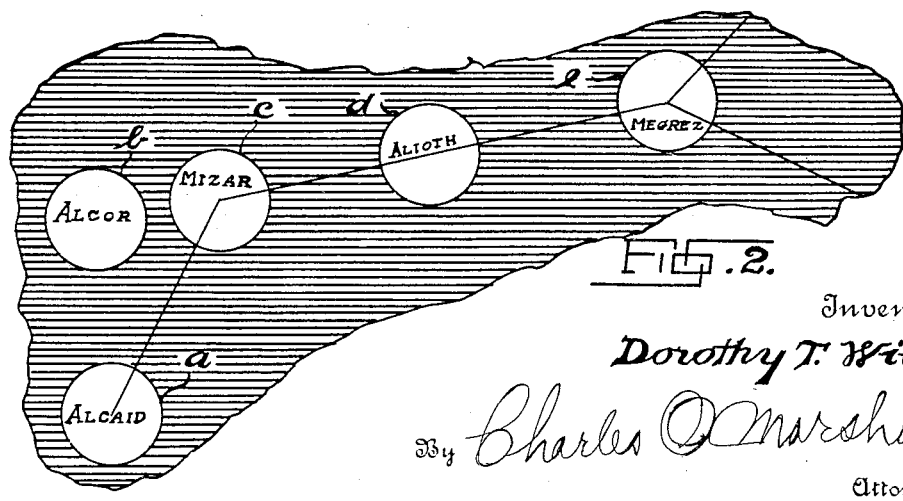
Fig. 2 is an enlarged fragmentary detail view showing a portion of one of the diagrams.
Figure 3:
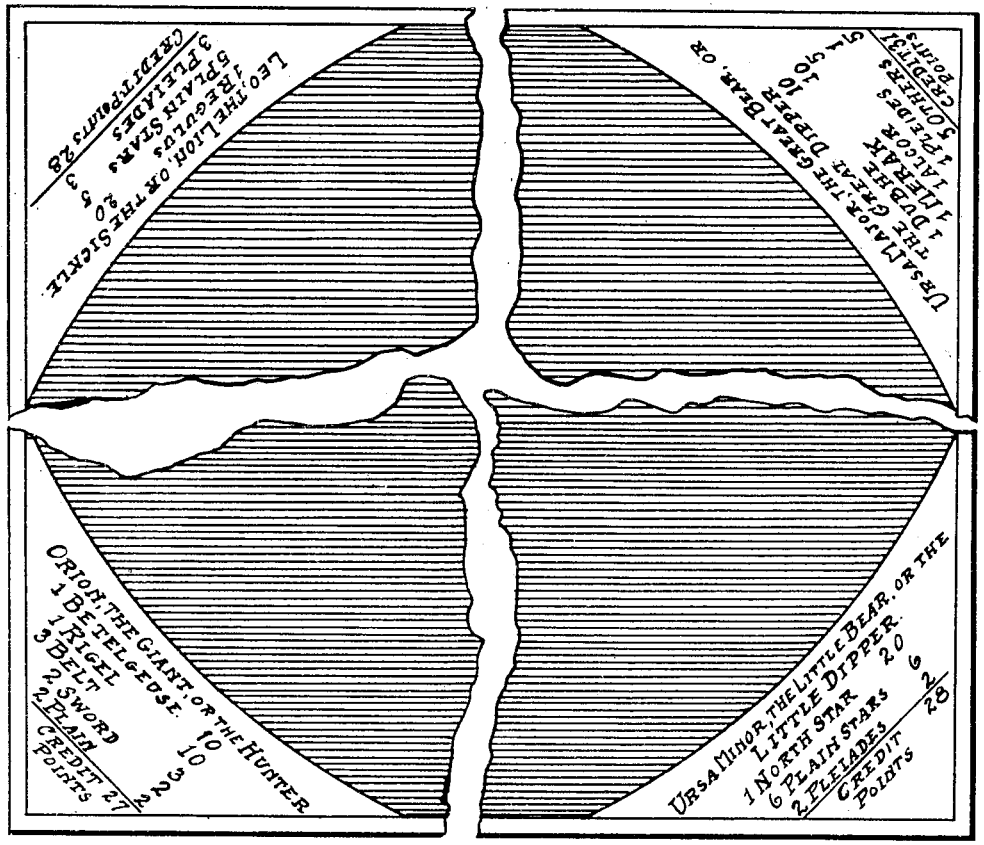
Fig. 3 is an enlarged fragmentary detail view showing the corners of the board.

As the board is shown in Fig. 1, the diagram A representing Ursa Major (the Great Bear or the Big Dipper) is positioned adjacent the remote or upper side of the board. The circles corresponding to all of the stars in this constellation are named as indicated in Fig. 3, the names being "Alcaid" (*a*), "Alcor" (*b*), "Mizar" (*c*), "Alioth" (*d*), "Megrez" (*e*), "Dubhe" (*f*), "Merak" (*g*) and "Phecda" (*h*).

The diagram B at the right side of the board represents Ursa Minor (the Little Bear or the Little Dipper). In this constellation the circle *i* at the end of the handle of the dipper is named "North Star." The other circles are identified by numbers, the one nearest the North Star circle being numbered "2," the next one being numbered "8," and the numbers of the circles in the bowl, beginning at the handle and reading clockwise, being respectively "5," "1," "6" and "12." It will be noted that the constellations Ursa Major and Ursa Minor are so placed on the board that the "pointers," Merak and Dubhe, and the North Star are in substantial alinement.

The diagram C at the near or lower side of the board represents Orion (the Giant or the Hunter). In this outline the circle *j* farthest to the left bears the name "Betelgeuse," while the name "Rigel" is inscribed within the circle *k* farthest to the right. The circle nearest the center of the board bears the numeral "3" and the circle adjacent the near or lower edge of the board is numbered "9." The three circles *l* in the central portion of the diagram are characterized by the words "Orion's Belt," while the two circles *m* below the belt are denominated "Orion's Sword."

The diagram D at the left of the board represents Leo (the Lion or the Sickle). In this outline the circle *n* adjacent the left edge of the board bears the name "Regulus." The other circles, taking them in order from Regulus, are numbered respectively "13," "11," "4," "7" and "10."

In the center of the board is a group E of six circles representing the Pleiades. The more remote or uppermost circle *o* of this group is marked "Pleiades Big Dipper,"

the two circles $p$ at the right of the group are marked "Pleiades Little Dipper," and the other three circles $q$ are marked "Pleiades Sickle." The total number of white circles on the board is thirty-six.

Figure 4:
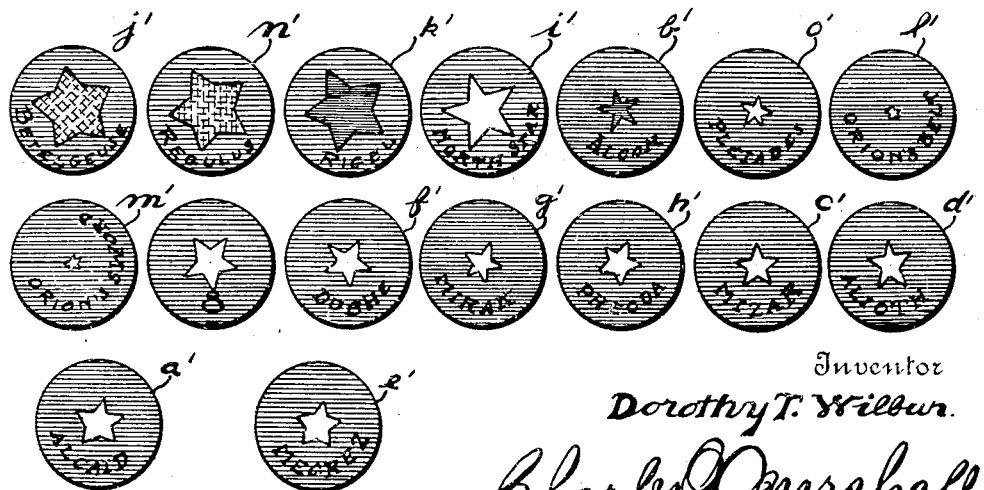
Fig. 4 is a detail plan view of the representative chips or markers used in playing the game.

The chips or markers shown in Fig. 4 may be of any preferred material, such as pasteboard, celluloid or wood. They are preferably slightly larger than the circles on the board and are also dark ultramarine blue in color. For every white circle that is distinctively named or numbered there is a correspondingly named or numbered chip. There are also two chips marked "Orion's Sword," three chips marked "Orion's Belt" and six chips marked "Pleiades," making, with the twelve distinctively named chips and the thirteen numbered chips, a total of thirty-six.

Each chip bears the figure of a star simulating by its size, color and sharpness the appearance of the star which it represents. Thus, Betelgeuse $j'$ is depicted on its chip as large and orange in color; Regulus $n'$ is large and yellow; Rigel $k'$ is large and light blue; North Star $i'$ is somewhat smaller and more pointed than Rigel and is white; Alcor $b'$ is very tiny and light blue; Pleiades $o'$, Orion's Belt $l'$, and Orion's Sword $m'$ are very small and white. The numbered stars, as well as Dubhe $f'$, Merak $g'$, Phecda $h'$, Mizar $c'$, Alioth $d'$, Alcaid $a'$ and Megrez $e'$, are white and intermediate "North Star" and the Pleiades stars in size.

In playing the game the thirty-six chips are stacked on the board and the players "cut" the stack in turn. The constellation containing the star cut by each player is the constellation to be filled by him. Should he cut a star belonging to a constellation previously assigned to another player, he must cut over.

The object of each player is to fill the constellation assigned to him by his cut, and, if the diagram of his constellation has less than nine circles, to also cover the circles in the Pleiades group containing the name of his constellation. The Sickle has only six circles, and is therefore said to "owe" three stars to the Pleiades. The Little Dipper "owes" two stars, and the Big Dipper one, while Orion, since it has nine circles to be filled, owes none to the Pleiades.

The chips are now shuffled and the dealer deals them, beginning at his left, to the several players, who stack them in the order received until each has nine chips. The player at the dealer's left then picks up the top chip from his stack and if it chances to represent a star belonging in his constellation, lays it over its appropriate circle on the board. If the chip chances to be one of the Pleiades he places it over an appropriate circle in the Pleiades group, unless his constellation happens to be Orion, in which case there is no appropriate circle in the Pleiades group, since Orion has nine stars and owes nothing to Pleiades. If he cannot properly place the chip in his constellation or in the Pleiades group, he lays it face down in the center of the board.

The next player now picks up the top chip from his stack of nine and places it in his constellation or the Pleiades group, if it properly belongs there. If not, he places it in the center of the board. The game proceeds in this manner until the original stack of each player is exhausted. The dealer then deals, without shuffling, the stack of unplaced chips which has accumulated in the center of the board, giving each player an equal number, the odd or surplus chips being again placed in the center. The players again proceed in turn to place their chips and the stack in the center is redealt as often as necessary until one of the players succeeds in filling his constellation and placing the stars, if any, owing to the Pleiades.

The player who succeeds in filling his constellation is credited with five points. Upon each corner of the board is printed a table of the stars belonging to the constellations at the left, each star being given a definite value, and the total value of all the stars in the constellation being indicated (see Fig. 3). The player who succeeds in filling his constellation is credited, in addition to the five points mentioned above, with the total value of the stars in his constellation.

Each of the other players is credited with the value of the stars he has placed. It will be noted that the values given the respective stars vary according to their importance. The North Star, for example, is valued at twenty points, while Merak is valued at ten points, and the Pleiades and numbered stars are valued at one point each. If a star is misplaced during the play the erring player is subjected to a fine of ten points. Any number of points may be chosen to limit the game or the tally may be carried along during the entire time at the players' disposal, the one having the greatest number of points when the playing ceases being considered the winner. The game is best played by four, but it also makes an exciting game for two, each attempting to fill either or both of two constellations.

In order to further add to the attractiveness of the game, I prefer to embellish the back of the board and the surfaces of the box or container adapted to receive it with artistic sketches and entertainingly-written little stories pertaining to the constellations and stars employed in the game. The stories accompanying different sets are adapted to entertain players of different ages, the games intended for the entertainment of older persons being accompanied by more scientific data than those intended for the amusement of small children. The corners of the board may, if desired, contain, in addition to the tables of points above referred to, brief statements as to the positions of the respective constellations in the heavens.

If desired, the stars which I have in this embodiment of the invention distinguished by numbers may be given their proper names. The numbers are used in this instance, however, with a view to exciting the wonder of those who become interested in the game and thereby prompting them to ascertain the names of these stars through their own efforts.

From the foregoing it is believed to be apparent that I have provided a game simple enough to be used in the kindergarten but which is capable of bringing enjoyment to persons of all ages and one in the use of which the player unconsciously absorbs a knowledge of the great constellations and the so-called fixed stars composing them.

While I have described only a single embodiment of my invention, it is to be understood that this embodiment is exemplary only and that the description is not to be taken in a limiting sense, but that this application is intended to cover all such embodiments as fall within the scope of the following claims.

I claim:

1. In a game, in combination, a board having a plurality of diagrams thereon, each diagram representing a group of elements having definite relative locations, the positions of the several objects in each group being indicated by the respective diagrams, and a series of markers corresponding respectively to said elements and adapted to be drawn in chance-controlled order and arranged upon the said diagrams.

2. In a game, in combination, a board having a plurality of diagrams thereon, each of said diagrams representing a group of natural objects having substantially fixed relative locations, the positions of the several objects in each group being indicated by the respective diagrams, and a series of markers, each representing one of said objects, said markers adapted to be drawn in chance-controlled order and placed in their proper positions upon said diagrams.

3. In a game, in combination, a board having a plurality of diagrams thereon, each diagram representing a constellation, and a series of chips, each representing a star of one of said constellations, said chips adapted to be drawn in chance-controlled order and placed in their proper positions upon said diagrams.

4. In a game, in combination, a board having adjacent each of its sides a diagram representing a constellation and adapted to be assigned to a player, and a series of chips, each representing a star of one of said constellations, said chips adapted to be dealt in chance-controlled order to such players and to be placed by them in their proper positions on said diagrams.

5. In a game, in combination, a board having adjacent each of its sides a diagram representing a constellation and adapted to be assigned to a player, and a series of chips, each representing a star of one of said constellations, said chips adapted to be dealt in chance-controlled order to such players and to be placed by them in their proper positions on said diagrams, said board also having tables of credits to be given such players for properly placing said chips.

6. In a game, in combination, a board having diagrams thereon adjacent its sides, said diagrams representing constellations having unequal numbers of stars, said board also having adjacent its center a representation of an additional constellation, each of said diagrams and certain of the stars of said additional constellation being adapted to be assigned to a player, and a series of chips representing the stars of said constellation adapted to be drawn in chance-controlled order by such players and placed by them in their proper positions upon said diagrams and upon the representation of said additional constellation.

DOROTHY T. WILBUR.

Witnesses:
MARIE MCNAMARA,
MARIE MYLER.